United States Patent

Ahrndt et al.

[11] Patent Number: 6,108,414
[45] Date of Patent: Aug. 22, 2000

[54] CIRCUIT ARRANGEMENT FOR THE SUBSCRIBER-REMOTE TERMINATION OF A SUBSCRIBER LINE IN THE FORM OF A TWO-LEAD COPPER LINE FOR THE TRANSMISSION OF HIGH BIT RATE DATA SIGNALS IN ADDITION TO ANALOG TELEPHONE SIGNALS

[75] Inventors: Thomas Ahrndt; Stephan Binde; Martin Braun, all of Munich; Ira Hilscher, Gauting; Karl Kloppe; Hans-Werner Rudolf, both of Munich, all of Germany

[73] Assignee: Siemens Aktiengesellschaft, Munich, Germany

[21] Appl. No.: 09/094,658

[22] Filed: Jun. 15, 1998

[30] Foreign Application Priority Data

Jun. 17, 1997 [DE] Germany ............................ 197 25 572

[51] Int. Cl.$^7$ ..................................................... H04M 1/00
[52] U.S. Cl. ............................................. 379/412; 379/412
[58] Field of Search ....................................... 379/399, 412

[56] References Cited

U.S. PATENT DOCUMENTS

| | | | |
|---|---|---|---|
| 5,889,856 | 3/1999 | O'Toole et al. | 379/399 |
| 5,898,761 | 4/1999 | McHale et al. | 379/93.05 |
| 6,005,873 | 4/1999 | Amit | 370/494 |

Primary Examiner—Richemond Dorvil
Attorney, Agent, or Firm—Hill & Simpson

[57] ABSTRACT

A circuit arrangement for a subscriber-remote termination of a subscriber line, high-bit rate data signals and analog telephone signals. The arrangement integrates exchange-side devices, a splitter and a modem into a subscriber line circuit for the subscriber line. Additionally, the exchange-side devices, splitter and modem may be protected from overvoltages by an overvoltage protection circuit contained within the subscriber line circuit.

13 Claims, 3 Drawing Sheets

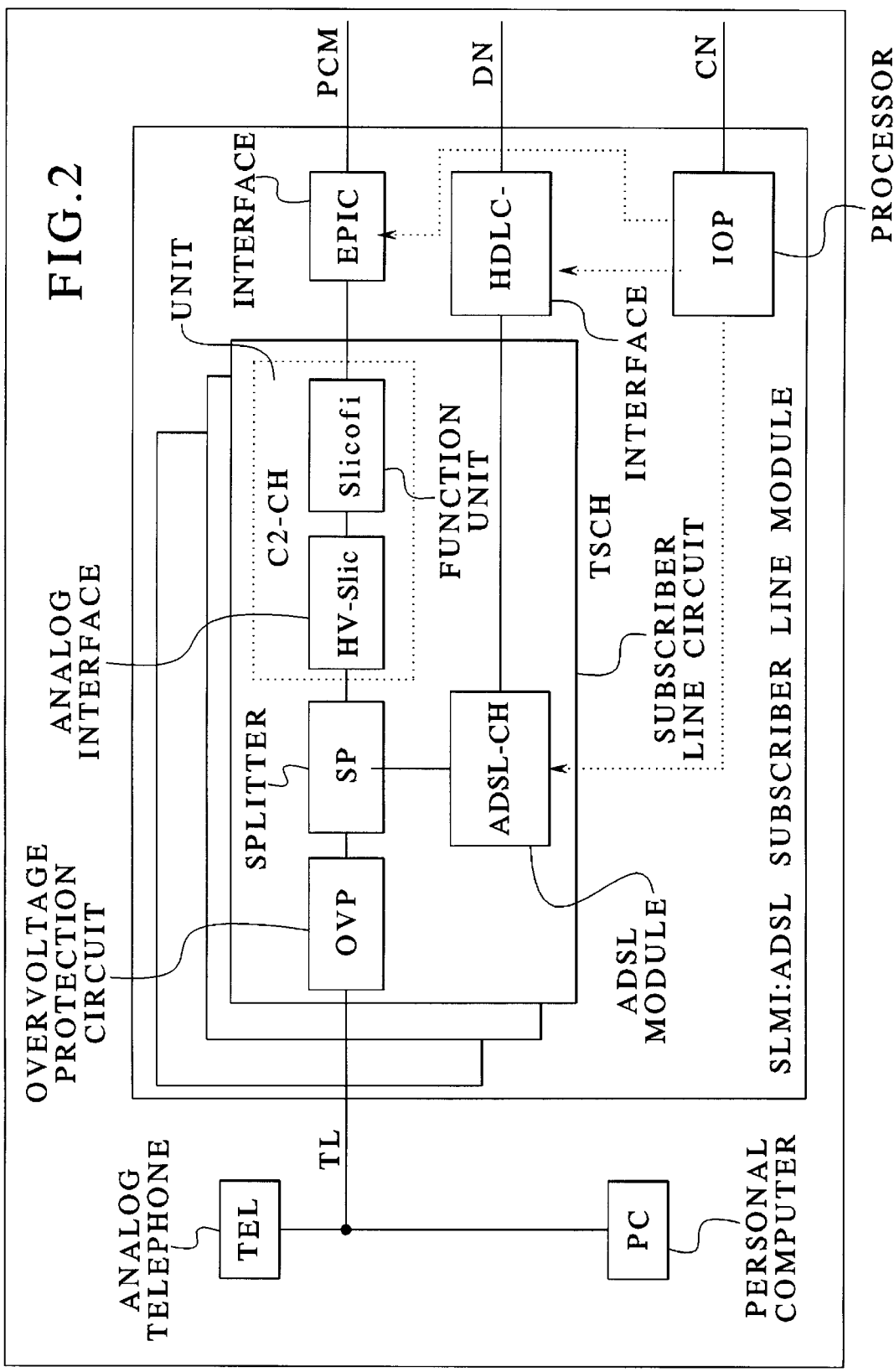

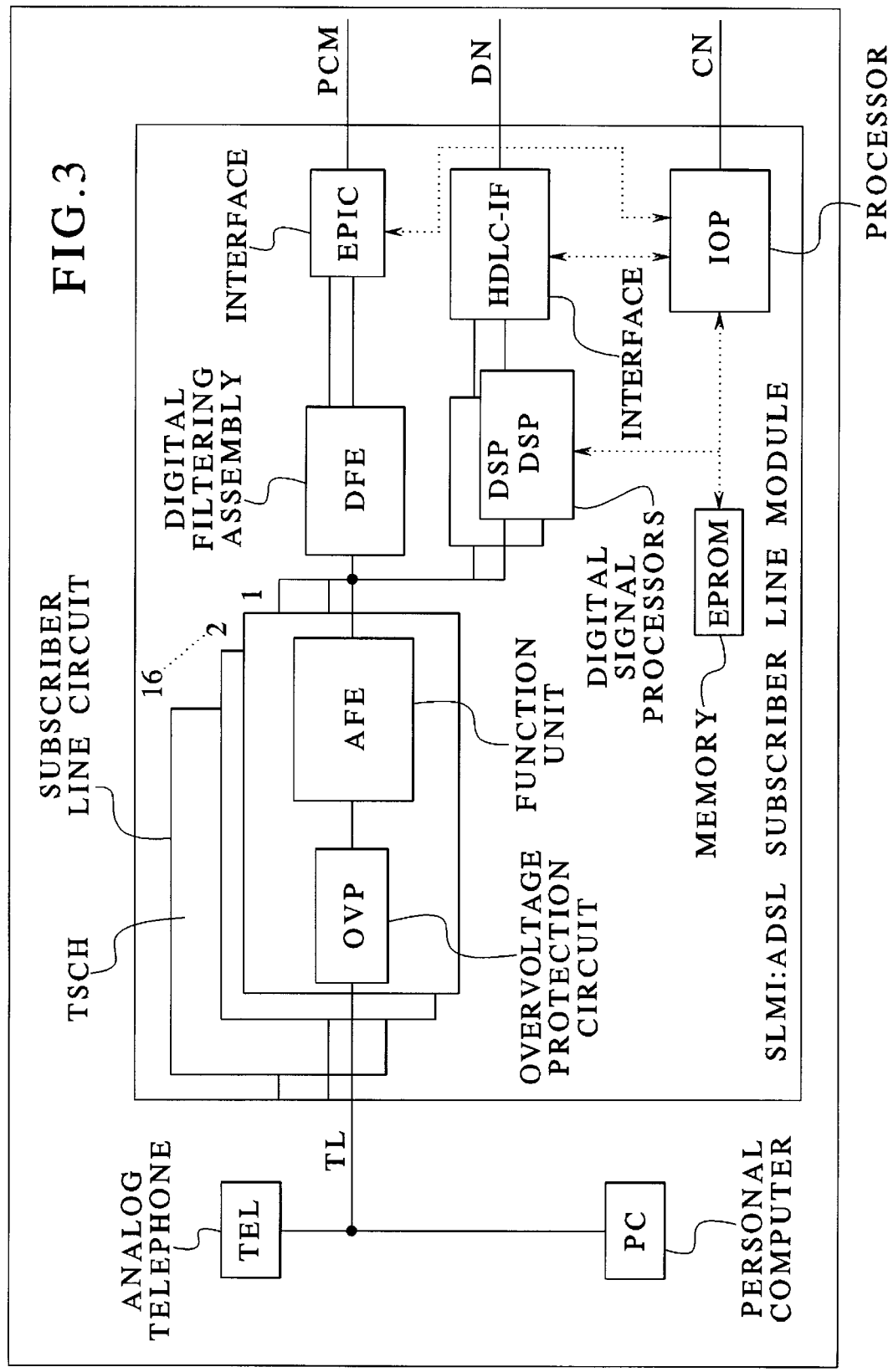

CIRCUIT ARRANGEMENT FOR THE SUBSCRIBER-REMOTE TERMINATION OF A SUBSCRIBER LINE IN THE FORM OF A TWO-LEAD COPPER LINE FOR THE TRANSMISSION OF HIGH BIT RATE DATA SIGNALS IN ADDITION TO ANALOG TELEPHONE SIGNALS

BACKGROUND OF THE INVENTION

The present invention is directed to a circuit arrangement for a subscriber-remote termination of a subscriber line, high bit rate data signals and analog telephone signals being transmitted over a two-lead copper line.

The subscriber-remote termination of a subscriber line is in the form of a two-lead copper line. In addition to telephone signals in the voice band that are exchanged between the telephone set of a subscriber terminal equipment and a telephone exchange, a high-rate data signal stream in the direction from a subscriber-remote central to the subscriber terminal equipment and a data signal stream in the direction from the subscriber terminal equipment to the central having a lower rate compared thereto are transmitted in a frequency band that is above the voice band.

Such a utilization of existing subscriber lines in the form of a two-lead copper line is possible because of what is referred to as ADSL technology (Asynchronous Digital Subscriber Line) that identifies one of the transmission systems for new possibilities of utilizing existing, high-quality copper line networks. This is an alternative to the installation of new line networks for new communication services because of the high capital costs of copper line networks.

ADSL technology was originally provided for the transmission of demand services and, in particular, in conjunction with the individual retrieval of television programs (see, for example, ntz, No. 4/1995, pp. 28 ff.).

In this context, a high-rate digital signal from a central to the terminal equipment as well as a potentially bidirectional, lower-rate control signal between central and terminal equipment are transmitted over a main telephone terminal in addition to telephone signals that are exchanged between a telephone set of a terminal equipment and a telephone exchange. Via the control channel, the subscriber can designationally select, for example, video information in a server and have this played to the home tv set of the terminal equipment via the high-rate channel. According to the European standard, transmission rates of 2.048 Mbit/s, 4.096 Mbit/s as well as 6.144 Mbit/s are provided for the high-rate channel, 16 Kbit/s, 64 Kbit/s or 640 Kbit/s for the control channel.

Currently, ADSL technology is accorded greater significance for the access of terminal equipment to the Internet via telephone exchanges. In order to prevent a mutual influencing of analog telephone signals and the data signals of the ADSL method, the latter occupy a frequency range lying above the voice band.

Devices for separating and for merging telephone signals and data signals, (what are referred to as POTS splitters), as well as modems with which the complicated modulation and demodulation procedures applied in this context are executed (quadrature amplitude modulation QAM) are required both at the subscriber side as well as at the exchange side in conjunction with the ADSL method.

In previous line networks in ADSL technology, the equipment of the exchange side, i.e. splitters and modems, required in conjunction with the handling of the data signals were autonomous devices that had to be designed for protection against overvoltage since overvoltages transmitted there onto from the subscriber line can reach them (see, for example, the product information of the company analog devices "ADSL Solutions-AD20 msp 910"). Considerable additional space requirement is required in the exchange area, resulting in the required overvoltage protection circuit substantially contributing to the equipment costs.

SUMMARY OF THE INVENTION

In conjunction with a subscriber line that is utilized for data transmission in ADSL technology, the object of the present invention is to provide a circuit arrangement for the subscriber-remote termination of such a subscriber line that is more beneficial with respect to space requirement and costs than prior art solutions.

In general terms the present invention is a circuit arrangement for the subscriber-remote termination of a subscriber line in the form of a copper line. In addition to telephone signals lying in the voice band that are exchanged between the telephone set of a subscriber terminal equipment and a telephone exchange, a high-rate data signal stream in the direction from a subscriber-remote central to the subscriber terminal equipment and a data signal stream in the direction from the subscriber terminal equipment to the central having a lower rate compared thereto are transmitted in a frequency band lying above the voice band. The means for separating and merging data signals and telephone signals required given this utilization of the subscriber line as well as the required modem for the data signals are integrated into the subscriber line circuit for the connection of the subscriber line to the telephone exchange. They are protected against overvoltages appearing on the subscriber by the overvoltage protection circuit present thereat.

Accordingly, the required means for separating and merging data signals and telephone signals as well as the required modem for the data signals are integrated in the subscriber line circuit for the connection of the subscriber line to the telephone exchange, namely such that these devices are protected against overvoltages appearing on the subscriber line by the overvoltage protection circuit.

In this way, it is unnecessary to have to fashion the ADSL-specific parts at the exchange side such that they are protected against overvoltage. This results in a corresponding cost reduction. Overall, the present invention leads to a compact structure.

Advantageous developments of the present invention are as follows.

The means for separating and merging telephone signals and data signals can be set software-controlled to different impedances according to the respective demands upon utilization of the existing software control of the subscriber line circuit. As a result of this further integration step, it is not necessary to keep a plurality of hardware versions on hand for the splitters in conformity with different national requirements.

The integration of the ADSL-specific circuit parts into the subscriber line circuit is carried farther such that a common analog interface is formed for telephone signals and data signals. Also the splitter, by contrast to previous conditions, is a digital filter. A further cost reduction can thereby also be achieved.

The functions of the digital filter and of the modem are realized with a processor, for example a digital signal processor. A combination of a plurality of subscriber line circuits can form an assembly such that such an assembly has a lower plurality of processors than the plurality of subscriber line circuits combined to form an assembly. The processors can be randomly dynamically allocated to the subscriber line circuits. A further reduction of the hardware outlay thus derives.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 depicts a subscriber line module of this line network for the connection of subscriber lines used in ADSL technique;

FIG. 3 is an alternative to the subscriber line module according to FIG. 2.

DESCRIPTION OF THE PREFERRED EMBODIMENTS

Figure 1:
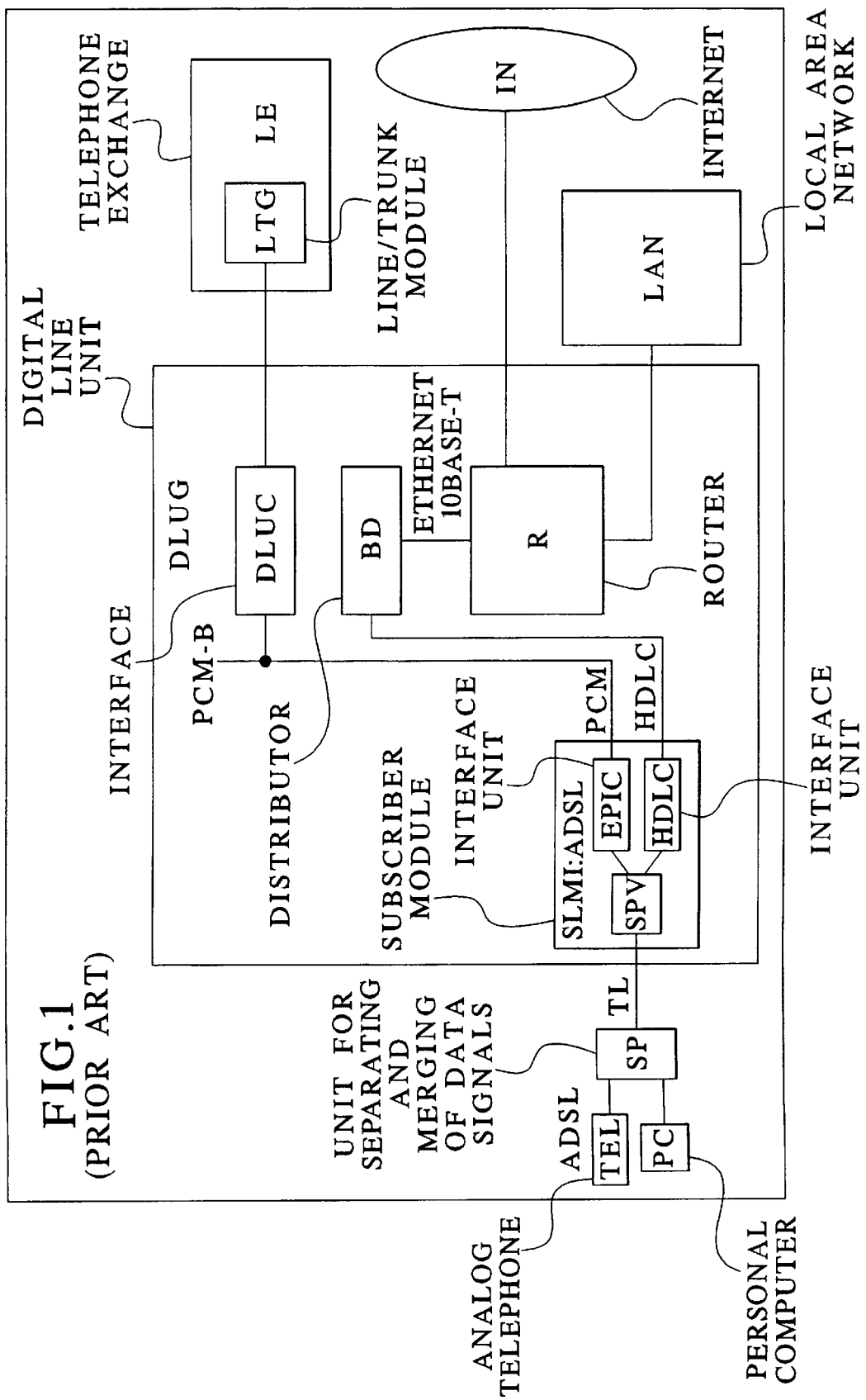
FIG. 1 is an overview of a part of a line network for a communication network.

As component parts of a communication network, FIG. 1 depicts the Internet IN as well as a public telephone exchange LE (standing for the public telephone switching network) with a line/trunk module LTG as a component part of the line circuit area of such a telephone exchange.

A digital line unit DLUG into which the subscriber lines of a variety of subscriber terminal equipment enter is shown as the crux of a line network for such a communication network.

A subscriber terminal equipment ADSL, which may be assumed to include a personal computer PC and an analog telephone apparatus TEL, as well as a subscriber line TL connecting this terminal equipment to the digital line unit DLUG are thereby emphasized. This subscriber line TL is a two-lead copper subscriber line on which a signal transmission can be executed in ADSL technique. A means SP for separating and merging data signals that are transmitted from and to a pc and telephone signals that proceed from the analog telephone apparatus TEL or, respectively, are intended for it, as well as a modem for the data signals are indicated at the terminal equipment side in view of the execution of this transmission technique. Terminal equipment from and to which a data transmission in the form of modem connections can occur, for example according to ITU-T standards, are not shown.

Within the digital line unit DLUG, the subscriber lines enter specific subscriber line modules that serve for the connection of a plurality of identical subscriber lines. For the subscriber line TL, this is a subscriber module SLMI:ADSL. A splitter SPV and a modem that correspond to the subscriber-proximate splitter SP or, respectively, modem are indicated in the form of a block as line-associated component parts of this subscriber line module that belong to the subscriber line TL and related to the ASDL transmission technique.

As mentioned, the splitter serves for the separation or, respectively, merging of data signals and telephone signals. Network-side inputs/outputs of the splitter SPV for telephone signals are connected via an interface unit EPIC to an internal PCM bus PCM-B of the digital line unit that combines corresponding outputs of a plurality of subscriber line modules and produces a connection to the public exchange LE via a network-side interface DLUC of the digital line unit. The splitter input/output for data signals leads via an interface HDLC and a distributor unit BD to a router R that represents the interface to the Internet IN or, respectively, directly to a local network LAN.

To an extent required for an understanding of the invention, FIG. 2 shows a subscriber line module SLMI:ADSL in greater detail.

It can be seen from FIG. 2 that the subscriber-remote ADSL-specific equipment belonging to the subscriber line TL, namely the splitter SP and an ADSL module ADSL-Ch in which the modem functions are essentially realized, are integrated into the subscriber line circuit TSCH individually associated to a subscriber line, namely such that they can be protected against overvoltage appearing on the subscriber line by an overvoltage protection circuit OVP that is also present as a component part of a standard subscriber line circuit. In the normal case, the overvoltage protective circuit OVP serves for the protection of the unit HV-Slic that represents the analog interface of the subscriber circuit TSCH for telephone signals and that is shown here as a component part of a unit C2-Ch that also includes a function unit Slicofi that essentially realizes the functions of analog-to-digital conversion or, respectively, digital-to-analog conversion, of filtering, of encoding and of the two-wire/four-wire transition and, among other things, contains a signal processor.

In the previous embodiment of the subscriber line circuit TSCH, the signal processor is also utilized for producing specific conditions with respect to the input impedance that, dependent on national demands, is to be complex or real at various heights.

According to a further development of the present invention, the integrated splitter is also controlled by the signal processor in order to meet these national demands, so that it is no longer necessary to make nation-specific hardware versions of splitters available.

The component parts EPIC and HDLC interface also shown in FIG. 2 are the same as those already described in conjunction with FIG. 1. They are under the control of an input/output processor IOP.

According to a further development of the invention, a common analog interface for telephone signals and data signals is formed in the subscriber line circuit TSCH, and the splifter is realized in the form of a digital filter. The splitter has, so to speak, been moved farther to the digital side. This can be seen in FIG. 3. This analog interface for telephone signals and data signals is realized in a function assembly AFE, and an analog-to-digital conversion of the signals transmitted proceeding from the subscriber equipment is undertaken without, however, a band limitation already ensuing, this being the job (in the version according to FIG. 2) of the unit Slicofi with respect to the telephone signals and of the unit ADSL-CH with respect to the data signals. In this version, the separating function of telephone signals and data signals ensues in the digital domain, namely by digital filtering by the unit DFE, which, like the unit SLICOFI according to FIG. 2, contains a digital signal processor, and by digital signal processors DSP that, moreover, are responsible for the realization of the ADSL modem functions.

According to a further development of the invention, the plurality of digital signal processors DSP shown in FIG. 3 is smaller than the plurality of the 16 subscriber line circuits TSCH indicated here and can be dynamically allocated to them.

It is also conceivable that the digital signal processor, which, as mentioned, is required for the realization of functions of the module DFE, not be permanently allocated to this module but likewise dynamically allocated from such a pool of signal processors.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A circuit arrangement for subscriber-remote termination of a subscriber line, comprising:

a subscriber line that is a copper line on which are transmitted telephone signals in a voice band that are exchanged between a telephone set of a subscriber terminal equipment and a telephone exchange, and on which are transmitted a high-rate data signal stream in a direction from a subscriber-remote central to the subscriber terminal equipment and a data signal stream in a direction from the subscriber terminal equipment to the central in a frequency band lying above the voice band, the data signal stream having a lower data rate than a data rate of the high-rate data signal stream;

a subscriber line circuit for connecting the subscriber line to the telephone exchange;

the subscriber line having a splitter device for separating and merging data signals and telephone signals required by the subscriber line, having a modem for the data signals, and having an overvoltage protection circuit for protection of the splitter device and the modem against overvoltages appearing on the subscriber line.

2. The circuit arrangement according to claim 1, wherein the splitter device for separating and merging telephone signals and data signals is settable by software-control to different impedances according to respective demands upon utilization of existing software control of the subscriber line circuit.

3. The circuit arrangement according to claim 1, wherein the subscriber line circuit has a common analog interface for telephone signals and data signals; and wherein the splitter device is a digital filter for separating telephone signals and data signals.

4. The circuit arrangement according to claim 3, wherein functions of the digital filter and of the modem for the data signals are realized with digital signal processors.

5. The circuit arrangement according to claim 4, wherein a plurality of subscriber line circuits are combined to form an assembly, in a subscriber line module and wherein the subscriber line module has a lower plurality of said signal processors than the plurality of subscriber line circuits, the signal processors being randomly dynamically allocated to the subscriber line circuits.

6. The circuit arrangement according to claim 5, wherein the setting of the impedance of the splitter device for separating and merging telephone signals and data signals ensues using the dynamically allocatable signal processors.

7. A circuit arrangement for subscriber-remote termination of a subscriber line, comprising:

a subscriber line that is a copper line on which are transmitted telephone signals in a voice band that are exchanged between a telephone set of a subscriber terminal equipment and a telephone exchange, and on which are transmitted a high-rate data signal stream in a direction from a subscriber-remote central to the subscriber terminal equipment and a data signal stream in a direction from the subscriber terminal equipment to the central frequency band lying above the voice band, the data signal stream having a lower data rate than a data rate of the high-rate data signal stream;

a subscriber line circuit for connecting the subscriber line to the telephone exchange, the subscriber line circuit having a common analog interface for telephone signals and data signals;

the subscriber line having a splitter device for separating and merging data signals and telephone signals required by the subscriber line, having a modem for the data signals, and having an overvoltage protection circuit for protection of the splitter device and the modem against overvoltages appearing on the subscriber line, the splitter device is a digital filter for separating telephone signals and data signals;

functions of the digital filter and of the modem for the data signals being realized with digital signal processors.

8. The circuit arrangement according to claim 7, wherein the splitter device for separating and merging telephone signals and data signals is settable by software-control to different impedances according to respective demands upon utilization of existing software control of the subscriber line circuit.

9. The circuit arrangement according to claim 7, wherein a plurality of subscriber line circuits are combined to form an assembly, in a subscriber line module and wherein the subscriber line module has a lower plurality of said signal processors than the plurality of subscriber line circuits, the signal processors being randomly dynamically allocated to the subscriber line circuits.

10. The circuit arrangement according to claim 9, wherein the setting of the impedance of the splitter device for separating and merging telephone signals and data signals ensues using the dynamically allocatable signal processors.

11. A circuit arrangement for subscriber-remote termination of a subscriber line, comprising:

a subscriber line that is a copper line on which are transmitted telephone signals in a voice band that are exchanged between a telephone set of a subscriber terminal equipment and a telephone exchange, and on which are transmitted a high-rate data signal stream in a direction from a subscriber-remote central to the subscriber terminal equipment and a data signal stream in a direction from the subscriber terminal equipment to the central frequency band lying above the voice band, the data signal stream having a lower data rate than a data rate of the high-rate data signal stream;

a plurality of subscriber line circuits combined to form an assembly, in a subscriber line module for connecting the subscriber line to the telephone exchange;

the subscriber line having a splitter device for separating and merging data signals and telephone signals required by the subscriber line, having a modem for the data signals, and having an overvoltage protection circuit for protection of the splitter device and the modem against overvoltages appearing on the subscriber line;

the subscriber line circuits having a common analog interface for telephone signals and data signals;

the splitter device being a digital filter for separating the telephone signals and data signals;

functions of the digital filter and of the modem for the data signals being realized with digital signal processors; and the subscriber line module having a lower plurality of said signal processors than the plurality of subscriber line circuits, the signal processors being randomly dynamically allocated to the subscriber line circuits.

12. The circuit arrangement according to claim 11, wherein the splitter device for separating and merging telephone signals and data signals is settable by software-control to different impedances according to respective demands upon utilization of existing software control of the subscriber line circuit.

13. The circuit arrangement according to claim 11, wherein the setting of the impedance of the splitter device for separating and merging telephone signals and data signals ensues using the dynamically allocatable signal processors.

\* \* \* \* \*